United States Patent
Burch et al.

(10) Patent No.: US 7,647,624 B2
(45) Date of Patent: Jan. 12, 2010

(54) TECHNIQUES FOR PRESERVING AND MANAGING IDENTITIES IN AN AUDIT LOG

(75) Inventors: Lloyd Leon Burch, Payson, UT (US); Stephen R. Carter, Spanish Fork, UT (US); Douglas G. Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 832 days.

(21) Appl. No.: 11/290,971

(22) Filed: Nov. 30, 2005

(65) Prior Publication Data

US 2007/0124820 A1    May 31, 2007

(51) Int. Cl.
    *H04L 9/00* (2006.01)
(52) U.S. Cl. .................. 726/1; 726/2; 726/3; 726/4; 713/181
(58) Field of Classification Search .............. 726/1–4, 726/10; 713/178–181, 189–190; 705/50, 705/64, 75–76
See application file for complete search history.

(56) References Cited

U.S. PATENT DOCUMENTS

| | | | |
|---|---|---|---|
| 5,790,674 A | 8/1998 | Houvener et al. | |
| 5,987,611 A | 11/1999 | Freund | |
| 6,115,680 A | 9/2000 | Coffee et al. | |
| 6,192,365 B1 | 2/2001 | Draper et al. | |
| 6,574,729 B1 | 6/2003 | Fink et al. | |
| 6,707,381 B1 | 3/2004 | Maloney | |
| 6,738,905 B1 | 5/2004 | Kravitz et al. | |
| 7,292,996 B2 * | 11/2007 | Nobrega et al. | ............... 705/39 |
| 2001/0039579 A1 | 11/2001 | Trcka et al. | |
| 2003/0236992 A1 | 12/2003 | Yami | |
| 2005/0232421 A1 | 10/2005 | Simons et al. | |
| 2005/0234909 A1 | 10/2005 | Bade et al. | |

FOREIGN PATENT DOCUMENTS

| | | |
|---|---|---|
| EP | 1401160 | 3/2004 |
| GB | 2390703 A | 1/2004 |
| GB | 2401221 A | 11/2004 |
| WO | WO-0223366 A1 | 3/2002 |
| WO | WO-2005103985 A2 | 11/2005 |

OTHER PUBLICATIONS

"European Application Serial No. 06123514.9, Extended Search Report mailed May 18, 2009", 13 pgs.

* cited by examiner

*Primary Examiner*—Hosuk Song
(74) *Attorney, Agent, or Firm*—Schwegman, Lundberg & Woessner, P.A.

(57) ABSTRACT

Techniques are provided for preserving and managing identities within an audit log. Initial entries into a log do not include an explicit and direct reference to an agent that performs a transaction; rather, the agent acquires a temporary transaction identity for the transaction and an indirect reference to the transaction identity is written to the log while the transaction is pending. Once the transaction completes a direct reference to the transaction identity is written to the log, the identity of agent remains transparent until the identity of the agent expires, if at all.

8 Claims, 4 Drawing Sheets

# TECHNIQUES FOR PRESERVING AND MANAGING IDENTITIES IN AN AUDIT LOG

FIELD

The invention relates generally to security and more particularly to techniques for preserving and managing identities within an audit log.

BACKGROUND

Electronic audit logs are critical for determining compliance to policy in operational procedures. This is especially true when considering electronic procedures of automated processes. By their nature, electronic procedures can be carried out in great numbers, each of which may be critical to the proper operation of an enterprise. Furthermore, automated processes are capable of performing a large number of transactions in a relatively short amount of time. Therefore, if proper operation is not ensured, the problems caused by lack of control may be catastrophic to the enterprise in a short period of time.

For nefarious individuals that seek to commit crimes against an enterprise, subverting electronic procedures is a must in order to effectuate their crimes and obscure or erase their trail, which may detail their activities. For example, one way to obscure a financial transaction is to use a valid identity that is not associated with the perpetrator. For this to work the valid identity must be a type that can legitimately perform the transaction and it must be valid at the time the perpetrator uses it.

One rich source for perpetrators to acquire valid identities is a traditional audit log. These logs are critical to determining compliance to policy of an enterprise's electronic procedures, as mentioned above, but logs also include rich information for intruders if they are located and compromised. That is, conventional audit logs by their very nature provide references to identities associated with a transaction and identities provide a mechanism by which intruders can perpetrate bogus transactions against an enterprise.

Thus, identities, within audit logs, should be preserved and managed in more secure manners.

SUMMARY

In various embodiments, techniques are provided for preserving and managing identities within an audit log. A transaction identity is obtained for a transaction and an index entry is generated for an index structure that references the transaction identity. Furthermore, a message digest is identified for the transaction identity. Next, an initial log entry is emitted within a log that identifies the index entry and a reference to the message digest for tracking the transaction. The index structure remains secure and is only accessible to authorized resources.

DETAILED DESCRIPTION

Figure 1:
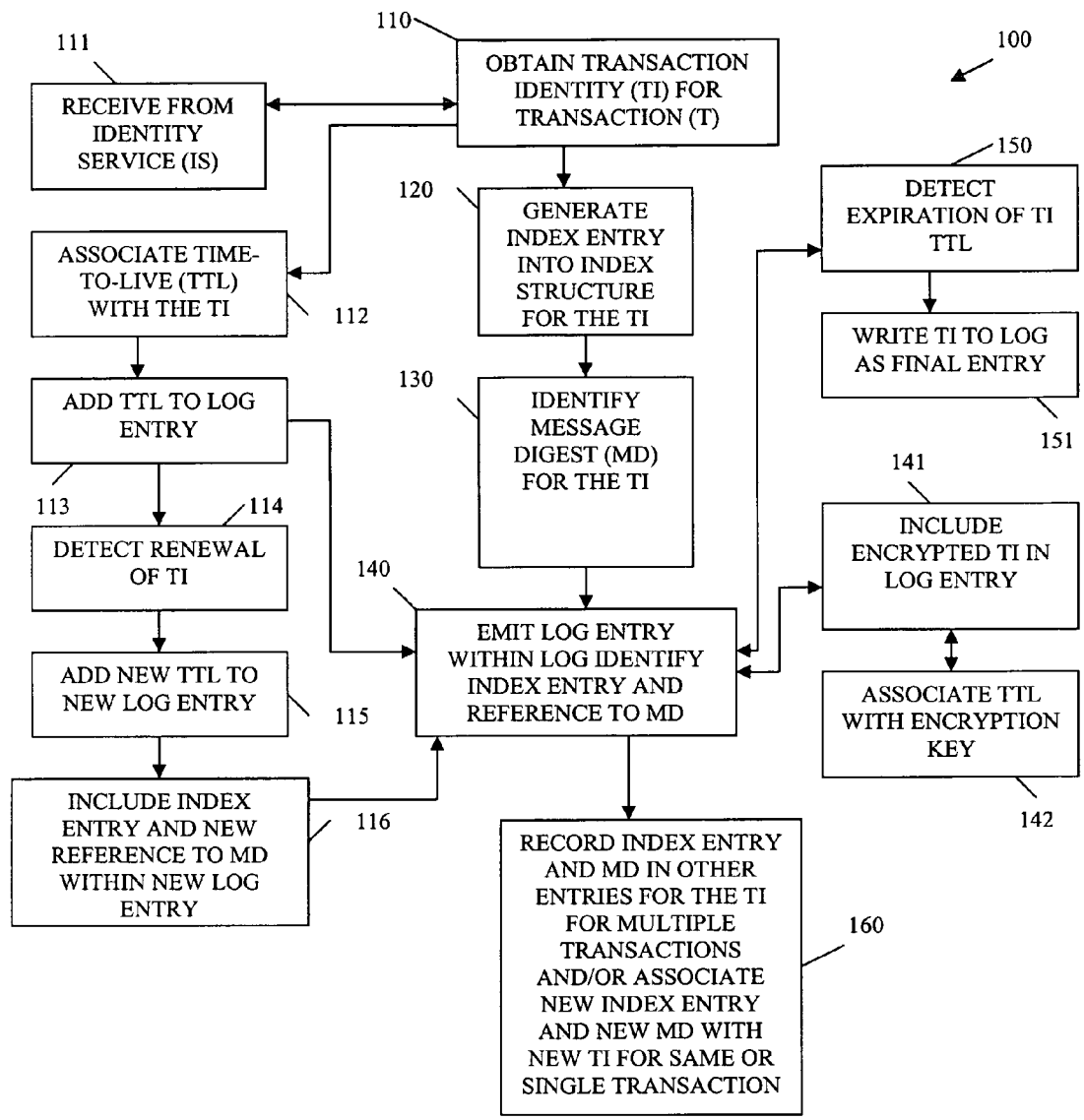
FIG. 1 is a diagram of a method for preserving and managing log entries for a transaction, according to an example embodiment.

A "resource" includes a user, service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "agent" may be viewed as a true persona of principal. That is, an agent is a primary identity for a principal, such that the agent is permitted to manage the other identities that may be associated with principal and create new identities for the agent. Any particular assumed identity for an agent is dependent upon contexts and perhaps directions of the agent. In some embodiments, an agent is an automated service that takes on different transaction identities for each transaction that it processes.

An "identity" is something that is formulated from a one or more identifiers and secrets that provide a statement of attributes, roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger.

A "transaction identity" is a special identity having a temporary life span for the life of a given transaction performed by an agent. In an embodiment, the transaction identity is created by an identity service using an identity for the agent and/or identities of other resources included or used with the transaction. In some cases, the transaction identity may be a hash of the various identities associated with the transaction. In other cases, the transaction identity may be created using any mechanism deployed by an identity service to dole out identities. The transaction identity is associated with the agent and a given transaction performed by the agent.

An "identity service" is a service that manages identities on behalf of a principal. The identity service may itself be viewed as a principal in any given network transaction. Some example identity services that may be modified to achieve the teachings presented herein may be found in U.S. Ser. No. 10/765,523, entitled "Techniques for Dynamically Establishing and Managing Authentication and Trust Relationships," filed Jan. 27, 2004; U.S. Ser. No. 10/767,884, entitled "Techniques for Establishing and Managing a Distributed Credential Store," filed Jan. 29, 2004; and U.S. Ser. No. 10/770,677, entitled "Techniques for Dynamically Establishing and Managing Trust Relationships," filed on Feb. 3, 2004. The disclosures of which are incorporated by reference herein.

Various embodiments of this invention can be implemented in existing network architectures. For example, in some embodiments, the techniques presented herein are implemented in whole or in part in the Novell® network and proxy server products, identity management services (such as Access Manager®), and/or directory services, distributed by Novell®, Inc., of Provo, Utah.

Of course, the embodiments of the invention can be implemented in a variety of architectural platforms, operating and server systems, or services. Any particular architectural layout or implementation presented herein is provided for purposes of illustration and comprehension only and is not intended to limit aspects of the invention.

FIG. 1 is a diagram of a method 100 for preserving and managing log entries for a transaction, according to an example embodiment. The method 100 (hereinafter "log emitting service") is implemented in a machine-accessible and readable medium. The log emitting service is operational over and processes within a network. The network may be wired, wireless, or a combination of wired and wireless. In an embodiment, the identity management service interacts with identity services, such as the identity services discussed and incorporated by reference above.

At 110, the log emitting service obtains a transaction identity for a transaction. A service, such as an agent, processes the transaction. The transaction may include a variety of other resources and each of these resources may have their own identities. For example, in a financial transaction, an automated service (agent) may transfer funds from one bank account (resource) of a first person or entity (resource) to another bank account (resource) of a different second person or entity (resource).

The transaction is captured by the log emitting service and written to a log as one or more log entries. The one or more log entries may be viewed as an assurance record. The assurance record is a type of record included within an audit log that includes the information necessary to completely audit each step in the transaction. In some embodiments, the audit log or records are digitally signed or protected in some manner to prevent undetected deletion or addition of audit records to the audit log. Collections of the records provide valuable and trusted information about the services or processes that produce or emit the records.

In an embodiment, the log emitting service is integrated as an internal service to the agent that processes the transaction. That is, the agent is enabled to emit information being tracked in the audit log and the emitting is achieved via the log emitting service which is integrated or linked to the agent.

According to another embodiment, the log emitting service is entirely separate from the agent and designed to track operations of the agent as events raised by the agent during its processing and capture information which is written to the audit log. So, in some cases, the agent may be unaware of the log emitting service and its logging activities.

In still another embodiment, the log emitting service is an external service that cooperates with the agent to capture information that is captured in the audit log.

In some cases, at 111, the log emitting service initially acquires a transaction identity for a transaction from an identity service. The identity service (examples of identity services were described and incorporated by reference above) produces the transaction identity in response to an identity of the agent who performs the transaction and/or in response to one or more additional identities associated with resources that are involved in the transaction.

According to an embodiment, at 112, the transaction identity may be associated with a time-to-live (TTL) attribute. That is, the transaction identity may expire after some predefined and configurable period of time or upon the occurrence of some predefined event, such as completion of the transaction.

If a TTL attribute is associated with the transaction identity, then, at 113, that TTL attribute may be included within the log entry produced for the transaction in the audit log.

Additionally, at 114, it may be the case that if a transaction identity expires, the identity may be renewed. Renewal may be achieved via the identity service. If a renewed transaction identity is acquired, then, at 115, a new TTL attribute may be added to the audit log as a new entry and, as will be explained in greater detail below, a previous index entry for the transaction identity and a new reference to a message digest may be included in that new log entry, at 116.

At 120, the log emitting service generates an index entry into an index structure or store for the transaction identity. The index structure may be a table that when provided the index entry or index key returns the transaction identity. The index entry is included in the log entry of the log during the transaction, but a direct reference to the transaction identity is not written to the audit log until, as will be seen below, the transaction expires. The index structure is maintained securely by the log emitting service and only authorized requests may access it. Moreover, when the transaction identity expires, such as when the transaction completes, the index structure may be removed or may be removed after some configurable period of time. In some cases, the index structure may be encrypted such that only the proper decryption key or keys may decrypt it to acquire the transaction identity.

At 130, the log emitting service identifies a message digest for the transaction identity. The message digest is specific to a transaction identity that is associated with the agent and persists for the lifespan of the transaction identity. That is, a single agent may process a variety of transactions, where each transaction uses the transaction identity. The message digest includes the transaction identity for each transaction performed over the life of the transaction identity. Thus, the message digest provides a mechanism for auditing the activities of an agent and for associating transaction identities with a particular log record.

Once a transaction identity is known, an index entry is generated, and the value of the message digest is known, the log emitting service is ready to emit a log entry within the log. Accordingly, at 140, the log emitting service emits or writes a log entry to the log for a given transaction that identifies the index entry and the message digest.

Other information may be emitted to the log entry as well to provide descriptive information about a transaction. For example, a tag may be emitted that identifies a new transaction identity was established and any TTL attribute for that identity may be included in the log entry, as was described above with respect to the processing at 113.

During the processing of the transaction, the log entries that comprise an assurance record for the transaction within the audit log do not contain the transaction identity or the identity of the agent. Thus, any perpetrator seeking to acquire this identity for subsequent bogus transactions will be thwarted. However, if an authorized principal, such as an administrator or law enforcement possessing the proper subpoena for access, requests access to the index structure, then the log emitting service will authenticate such a request and provide access to these structures, such that the identity of the transaction and the agent may be obtained.

According to an embodiment, at 141, the log emitting service may also included the encrypted transaction identity that when decrypted identifies the transaction identity. This may be useful if the log emitting service or the transaction fails or aborts abnormally before it completes, since the encryption key may be used by an authorized principal to acquire the transaction identity. In some cases, at 142, the encrypted key may also include a TTL. For example, financial transactions may desire to have encrypted keys in the event that a pending transaction fails or aborts or is purposely made to look as if it aborts by a perpetrator. In such a case, depending on the size of the transaction the financial institution may wish to assign a configurable TTL attribute to the encryption key. So, a $20 transaction may have a key that expires in 1-3 days, whereas a $100,000 transaction may have a key that expires in 1-3 years. For administrative purposes it may be desirable to discard and recycle keys in this manner with TTL attributes.

In an embodiment, at 150, the log emitting service detects that the TTL for the transaction identity has expired. When this occurs, at 151, the log emitting service writes, as a final record in the audit log, the entire expired transaction identity. This does not pose a problem, because the transaction identity, in this case, expired when the transaction completed and when the transaction completes, the transaction identity is no longer valid to perform the transaction or any other transaction for that matter. Further, the message digest from any previous log record that was generated using the transaction identity may now be associated with the expired transaction identity by comparing the message digest from a log record with the message digest of the transaction identity in the final log entry.

As was mentioned above, at various points during the transaction or life-cycle of the transaction identity, records or entries are emitted to the audit log. These entries may include tags that generically define what is transpiring such as, "Transaction Identity Obtained," "Transaction Identity Renewed," "Transaction Identity Expired," and the like.

For example, for an example financial transaction an example entries within the audit log, which comprise an assurance record, may appear as follows:
1. <transaction-ID-Obtained><TTL=5 minutes><Index=004><MD=404>;
2. <Wire Transaction><Sending account: xxx-xxx-xxx><Receiving account: yyy-yyy-yyy><Amount transferred: 10000.00><Authorizing entity: MD: 404, Index: 004>;
3. <Expired-ID><MD=404><transaction identity=fserv100>.

The first entry (1) indicates a new transaction identity was obtained and it included the optional TTL attribute of 5 minutes. In (1) the transaction identity was masked and referenced via an index entry of "004" and similarly the messaged digest (MD) of the transaction identity was provided as "404." In (2) the agent performed a wire transfer from a sending account and a receiving account for an amount of $10,000 and again the agent performing this via a transaction identity is masked via the MD reference to "404" and the temporary identity (transaction identity) was masked via index entry "004." Finally, in (3) the transaction identity expires, so the identity of the transaction identity is revealed as "fserv100."

According to an embodiment, at 160, the log emitting service may also perform one or more alternative techniques with respect to the transaction identity and with respect to same or different transactions. For example, a transaction identity may be assigned a set TTL attribute, and that TTL attribute may actually span two or more different transactions. In such a case, the log emitting service may record the index entry and the message digest in other log entries associated with the different transactions. As another example, the transaction identity may expire before the transaction with which it is associated completes. In this case, the log emitting service may associate a new index entry and new message digest for a new transaction identity within the log for the transaction. Thus, the transaction identity may span several transactions or may not exist to see the conclusion of a single transaction with which it is associated.

The method 100 demonstrates how identities associated with a transaction may be preserved and managed in a secure manner to maintain the operational effectiveness of an audit log and yet at the same time provide security against intruders to an enterprise. Again, as added security, the entire audit log and/or the individual entries in the audit log may be encrypted and/or digitally signed for additional security.

Figure 2:
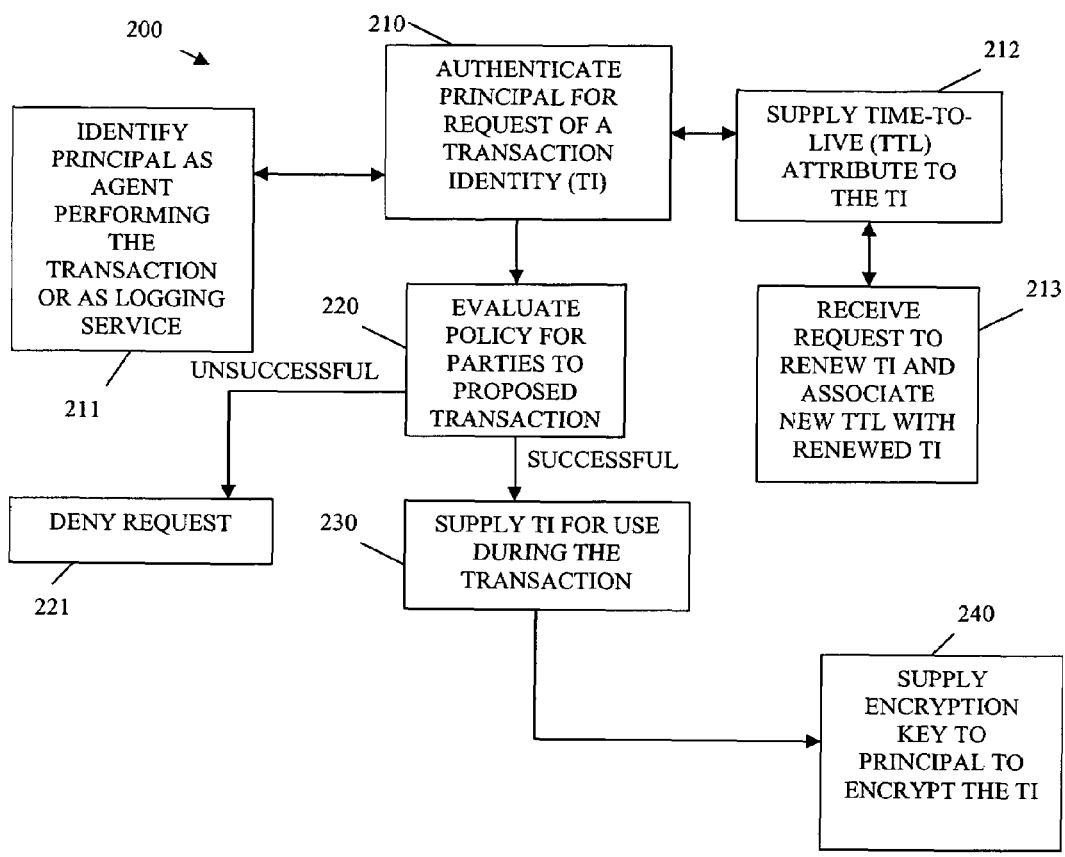
FIG. 2 is a diagram of method for providing transaction identities for transactions that are tracked via log entries, according to an example embodiment.

FIG. 2 is a diagram of method 200 for providing transaction identities for transactions that are tracked via log entries, according to an example embodiment. The method 200 (hereinafter "transaction identity service") is implemented in a machine-accessible and readable medium and is accessible over a network. The network may be wired, wireless, or a combination of wired and wireless. In an embodiment, the transaction identity service is a modified version of the identity services, which were discussed and incorporated by reference above. Furthermore, the transaction identity service may interact with the log emitting service, which is represented by the method 100 of FIG. 1, for purposes of supplying a transaction identity for a principal for a transaction.

The transaction identity service is used to facilitate the management of identities and perhaps other secret information, such as keys, to the log emitting service represented by the method 100 of the FIG. 1. In this regard, the transaction identity service is in a secure and trusted relationship with agents and with the log emitting service. Communications amongst the parties may be over secure communications channels and/or achieved view secure encrypted communications.

At 210, the transaction identity service authenticates a principal for a request; the request is associated with acquiring a transaction identity for a given transaction. At 211, the requester may be identified as an agent that is performing the transaction in question or alternatively the requestor may be a logging service, such as the log emitting service represented by the method 100 of the FIG. 1. So, an agent may directly request the transaction identity from the transaction identity service or a logging service may request it on behalf of the agent, since it is the logging service that will use the transaction identity to make entries in an audit log.

According to an embodiment, at 212, the transaction identity service may also be used to supply a TTL attribute for the transaction identity. Again, the TTL attribute may identify a period of time or other configurable event, which if detected results in the transaction identity becoming expired and unusable.

In some instances, at 213, the transaction identity service may also subsequently receive a request to renew an existing transaction identity that has since expired or is scheduled to expire soon. In such a situation, the transaction identity service may assign a new TTL attribute to the renewed transaction identity. Examples of a renewed transaction identity were provided above with respect to the method 100 of the FIG. 1.

At 220 and after the request is received and the principal is authenticated to the transaction identity service, the transaction identity service evaluates one or more policies for the parties involved in the proposed transaction that an agent is going to perform and for which the transaction identity is being requested. If the policy evaluation is unsuccessful, then, at 211, the request for the transaction identity is denied.

However, at 230, if the policy evaluation is successful, then the transaction identity service supplies a new transaction identity to the requesting principal. The transaction identity may be generated using a predefined algorithm that includes the identity of the principal, the agent (if different from the principal), and identities of resources involved in the transaction. Alternatively, the transaction identity service may have a list of available and recycled identities that it doles out. Still further, a random generation algorithm may be used to generate a unique identity based on a variety of factors. In fact, any technique known to and controlled by the transaction identity service may be used to generate the transaction identity.

According to an embodiment, at 240, the transaction identity service may supply an encryption key to the principal allowing the encryption of the transaction identity. Access to the key may be subsequently acquired via the transaction identity service by authorized principals or may be acquired through some common mechanisms known to the principals, such as a public key of the transaction identity service and a private key of an authorized principal.

The transaction identity service provides a mechanism and service to acquire transaction identities for transactions. These identities are associated with the agents that process transactions and can be tied back to the agents via techniques described above with the method 100 of the FIG. 1. This facilitates the preservation and management of identities referenced in audit logs in a secure and yet still effectively usable manner.

Figure 3:
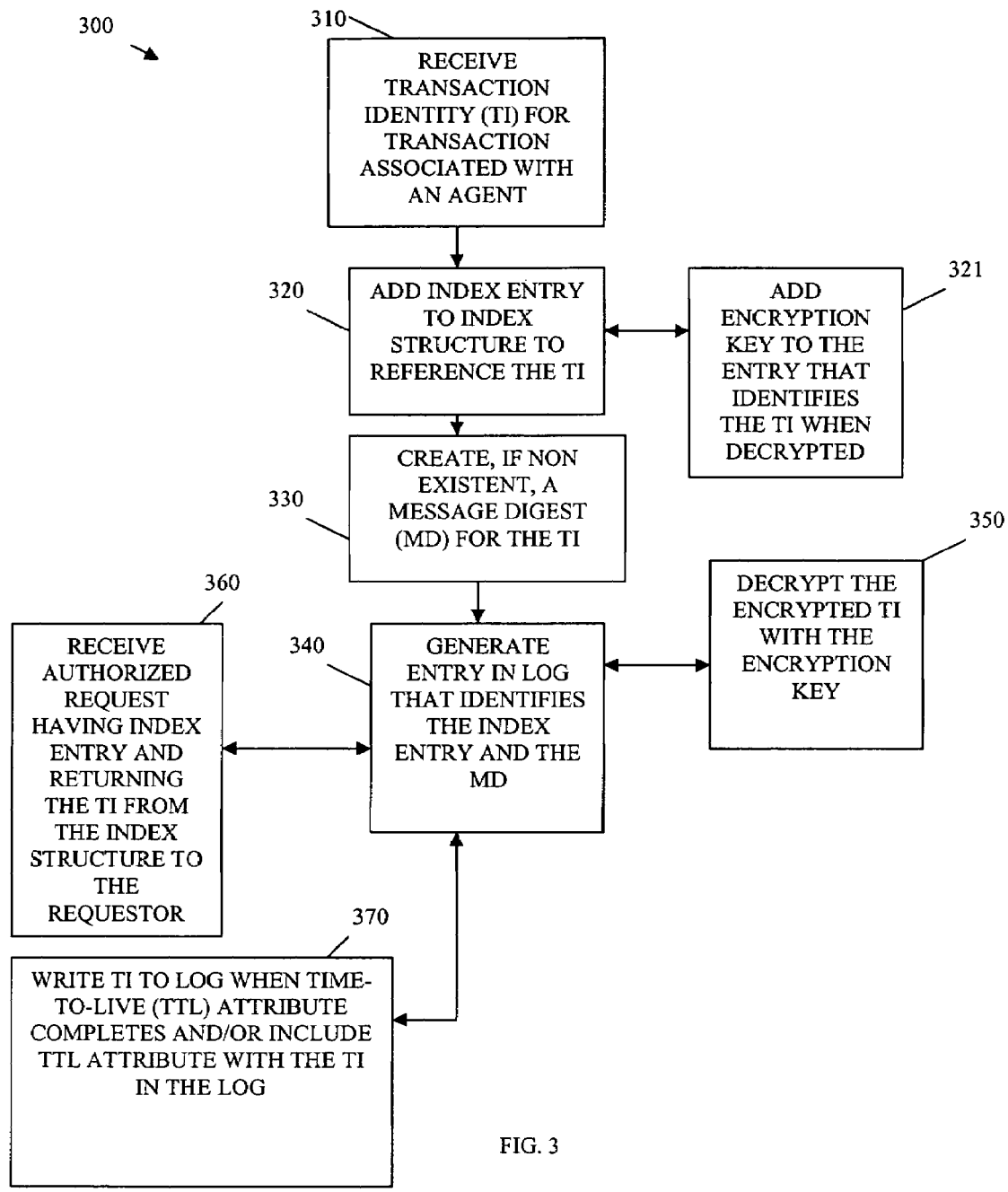
FIG. 3 is a diagram of another method recording and managing log entries for a transaction, according to an example embodiment.

FIG. 3 is a diagram of a method 300 recording and managing log entries for a transaction, according to an example embodiment. The method 300 (hereinafter "logging service") is implemented in a machine accessible and readable medium and is operational over a network. The network may be wired, wireless, or a combination of wired and wireless. The logging service presents a different perspective of the log emitting service represented by the method 100 of FIG. 1. Moreover, the logging service may also interact with the transaction identity service represented by the method 200 of the FIG. 2.

The logging service interacts with an agent that processes a transaction and acquires certain information, as described below, that permits the logging service to preserve identities and yet still effectively reference them (indirectly) in audit logs for subsequent consumption by authorized principals.

At 310, the logging service receives a transaction identity for a transaction associated with an agent. The transaction identity is received or emitted from the agent and captured directly or indirectly by the logging service.

At 320, the logging service adds an index entry to an index structure that references the transaction identity. That is, the index entry or key is written and available in the audit log being produced or written to by the logging service and an authorized principal having this index entry or key may access the index structure to discover the transaction identity. Access to the index structure is restricted by the logging service to authorized principals and maintained securely. In some cases, the logging service may encrypt it as well.

According to an embodiment, at 321, the logging service may also add an encryption key to the entry that encrypts the transaction identity. In other words, the transaction identity may be encrypted within the index entry.

At 330, the logging service creates, if non existent, a message digest for the transaction identity.

At 340, the logging service generates an initial log entry for the transaction that is about to be performed by the agent. That log entry identifies the index entry and the message digest. An example of this was provided above with respect to the method 100 of the FIG. 1.

The logging service may then produce additional entries for the transaction as it processes within the audit log. Each entry will indirectly reference the transaction identity, via the index entry and the message digest. The final log entry for the transaction when the transaction completes is handled in a different manner, as is described below.

According to an embodiment, at 360, the logging service may receive an authorized request from a requestor (principal) that includes the index entry and a desire to access the index structure. Assuming the index structure has not been deleted, as may be the case when the transaction identity expires, the logging service validates the request and requester as being authorized for such as access, and if this is the case the transaction identity is returned to the requestor from the index structure.

In an embodiment, at 350, the transaction identity may be obtained from the log by decrypting the encrypted transaction identity included in it. The key necessary for decryption was obtained from the identity service by authorized entities, as described above.

The processing of 350 and 360 demonstrate how identities may be discovered by authorized requesters at different points during a transaction or even after a transaction has expired, either via completion or via abnormal termination. Thus, the identities are preserved with the limited information included in the audit log and may be obtained if needed by authorized principals.

At 370, the logging service may perform a variety of final processing. For example, when the transaction expires it is written as a final entry to the audit log. Additionally, a TTL attribute may be written in entries of the audit log. Still further, the message digest may be maintained.

Figure 4:
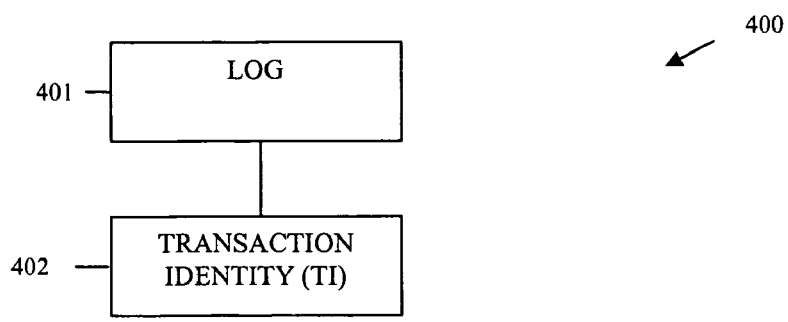
FIG. 4 is a diagram of an identity preserving and managing log system, according to an example embodiment.

FIG. 4 is a diagram of an identity preserving and managing log system 400, according to an example embodiment. The identity preserving and managing log system 400 is implemented in a machine-accessible and readable medium over a network, which is wireless, wired, or a combination of wired and wireless. The components of the identity preserving and managing log system 400 are consumed and managed by the methods 100, 200, and 300.

The identity preserving and managing log system 400 includes a log 401 and a transaction identity 402. Each of these will now be discussed in turn.

The log 401 may be encrypted and/or digitally signed for added security. Additionally, in some embodiments, the log 401 may be neither encrypted nor signed. The log 401 may be a file, a data structure housed in memory or storage, a data store table, and/or various combinations of the same. The log 401 includes one or more entries. Collections of entries represent an assurance record for any given transaction. Moreover, the log 401 may be viewed as an audit trace for transactions.

The log 401 does not include a direct reference to the transaction identity 402 for a given transaction until that transaction expires and is unusable. At that time, the log 401 includes the expired transaction identity 402. Prior to that time and during the transaction, the entries of the log 401 include indirect references to the transaction identity 402 via an index entry or key to an index structure. An authorized principal may acquire the transaction identity 402 for a failed transaction or a pending transaction using the index entry of key to access the index structure.

The transaction identity 402 is a temporary identity that is assumed by an agent to process a transaction. The transaction identity 402 expires after a TTL amount of time or event or when the transaction normally or abnormally terminates.

In an embodiment, the entries of the log 401 may include a TTL attribute for the transaction identity 402; an encrypted version of the transaction identity 402 may be used to acquire the transaction identity 402. A last entry for the log 401, which is associated with a completed transaction, includes a specific reference to the transaction identity 402.

The log 401 and its entries are produced by a logging service and may be emitted by the agent that processes a transaction. Examples of logging services and agent processing were described above with respect to the methods 100 and 300 of the FIGS. 1 and 3, respectively. Moreover, the creation and maintenance of the transaction identity 402 may be acquired and managed by a transaction identity service. An example of a transaction identity service was provided above with respect to the method 200 of the FIG. 2. In some cases, the logging service may detect actions of the agent during the processing of the transaction, unbeknownst to the agent or known and in cooperation with the agent, and produce therefrom the entries included in the log 401.

Figure 5:
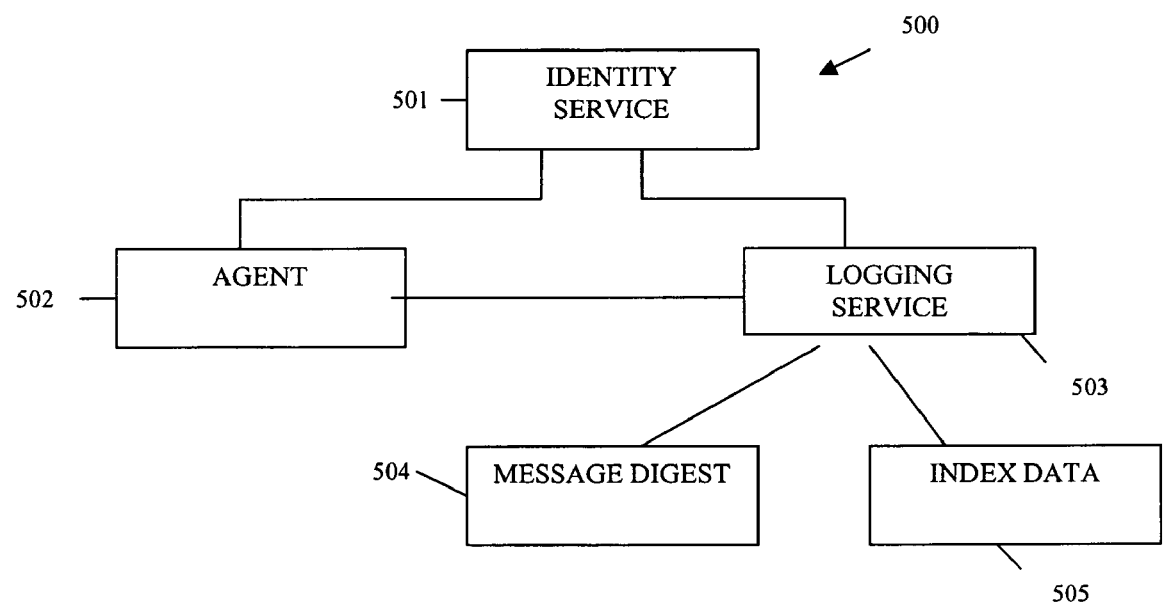
FIG. 5 is a diagram of another identity preserving and managing log system, according to an example embodiment.

FIG. 5 is a diagram of another identity preserving and managing log system 500, according to an example embodiment. The identity preserving and managing log system 500 is implemented in a machine machine-accessible and readable medium and is operation over a wired, wireless, or a combination of wired and wireless network. The identity preserving and managing log system 500 may consume and manage the identity preserving and managing log system 400, which is depicted in FIG. 4. Furthermore, the identity preserving and managing log system 500 may implement the methods 100, 200, and/or 300 of the FIGS. 1-3, respectively.

The identity preserving and managing log system 500 includes an identity service 501, an agent 502, and a logging service 503. The identity preserving and managing log system 500 may also include a message digest 504 and/or index data 505. Each of these will now be discussed in turn.

The identity service 501 is for securely managing and distributing securely transaction identities for transactions. These are temporary identities associated with specific transactions processed by the agent 502. The identity service 501 may also renew expired or soon to be expired transaction identities. Moreover, the identity service 501 may supply and manage TTL attributes associated with the transaction identities. An example identity service 501 was presented as the transaction identity service represented by the method 200 of the FIG. 2.

The agent 502 is an automated process that performs transactions using transaction identities supplied by the identity service 501. The agent 502 may directly emit information for populating entries to the audit log for the transactions or may emit events detected by the logging service 503. That is the agent 502 may directly interface and cooperate with the logging service 503 or it may be unaware of the logging service 503 and its logging activities. An example modified agent service was supplied above with respect to the method 300 of the FIG. 3. That is, the example modified agent service describes a cooperative agent service that interacts with a logging service 503 to produce entries in a log for a transaction.

The logging service 503 emits or generates log entries to an audit log. These entries do not directly identify the identity of the agent 502 and, at least while a transaction is still pending, do not identify the transaction identity. Examples of a logging service were provided above with respect to the method 100 of the FIG. 1.

In some embodiments, the identity preserving and managing log system 500 may also include a message digest 504.

According to an embodiment, the identity preserving and managing log system 500 may also include index data 505. The index data 505 persists over the lifespan of a transaction identity or for some configurable period of time thereafter. Index entries or keys included in log entries for uncompleted transactions are used to access the index data 505 and acquire identities for the transactions. The logging service 503 securely maintains the index data 505, and in some cases the index data 505 may be encrypted and/or digitally signed.

According to an embodiment, the logging service 503 may also include one or more encryption keys or encrypted information that when decrypted permit the transaction identity to be discovered. This may be useful when a transaction is aborted and the transaction identity is never written to the final entry of the transaction log. In such a case, the encrypted information may be used by an authorized principal to acquire the transaction identity.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to process on a machine, comprising:
    obtaining, by the machine, a transaction identity;
    generating, by the machine, an index entry into an index structure for referencing the transaction identity;
    identifying, by the machine, a message digest for the transaction identity;
    emitting, by the machine, a log entry within a log that identifies the index entry and the message digest for the transaction identity;
    associating, by the machine, a time-to-live (TTL) attribute to the transaction identity; and
    adding, by the machine, the TTL attribute to the log entry;
    detecting, by the machine, a renewal of the transaction identity;
    adding, by the machine, a new TTL attribute to a new log entry of the log; and
    including, by the machine, the index entry and a new reference to the message digest in the new log entry of the log.

2. The method of claim 1 further comprising:
    detecting, by the machine, expiration of the transaction identity; and
    writing, by the machine, the transaction identity to the log as a final log entry.

3. The method of claim 1 further comprising, including, by the machine, an encryption key with the log entry of the log, wherein the encrypted transaction identity if decrypted identifies the transaction identity.

4. A machine-implemented method to process on a machine, comprising:
    obtaining, by the machine, a transaction identity;

generating, by the machine, an index entry into an index structure for referencing the transaction identity;

identifying, by the machine, a message digest for the transaction identity; emitting, by the machine, a log entry within a log that identifies the index entry and the message digest for the transaction identity;

including, by the machine, an encryption key with the log entry of the log, wherein the encrypted transaction identity if decrypted identifies the transaction identity; and associating, by the machine, a time-to-live (TTL) attribute with the encryption key, wherein the TTL attribute is in response to a policy.

5. The method of claim 4 wherein obtaining further includes acquiring the transaction identity from an identity service in response to an identity of an agent who performs the transaction and in response to one or more additional identities associated with resources involved in the transaction.

6. A machine-implemented method to process on a machine, comprising:

obtaining, by the machine, a transaction identity;

generating, by the machine, an index entry into an index structure for referencing the transaction identity;

identifying, by the machine, a message digest for the transaction identity; emitting, by the machine, a log entry within a log that identifies the index entry and the message digest for the transaction identity; and processing, by the machine, at least one of:

recording the index entry and the message digest in one or more other log entries, wherein the transaction identity is associated with two or more transactions; and associating a new index entry and new message digest with a changed transaction identity within the log for a single transaction, and which is also associated with the original transaction identity.

7. A machine-implemented system, comprising:

an identity service implemented in a machine-readable medium and to execute on a machine;

a logging service implemented in a machine-readable medium and to execute on the machine, wherein the identity service is to supply a transaction identity for a transaction, and wherein the logging service is to generate entries into the log that does not identify the transaction identity while the transaction is pending and remains active; and index data residing in a machine-readable medium and accessed via the machine;

wherein the index data includes the transaction identity and a number of the entries include an index key into the index data to acquire the transaction identity, and wherein access to the index data is maintained securely by the logging service, wherein one or more of the entries includes an encryption key, and wherein the key identifies at least one of the index data and the transaction identity, and wherein a time-to-live (TTL) attribute is associated with at least one of the transaction identity and the encryption key.

8. The system of claim 7 further comprising, a message digest maintained by the logging service for the transaction identity.

* * * * *

UNITED STATES PATENT AND TRADEMARK OFFICE
CERTIFICATE OF CORRECTION

PATENT NO. : 7,647,624 B2 Page 1 of 1
APPLICATION NO. : 11/290971
DATED : January 12, 2010
INVENTOR(S) : Burch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this

Twenty-eighth Day of December, 2010

David J. Kappos
*Director of the United States Patent and Trademark Office*